United States Patent
Zhao et al.

(10) Patent No.: US 12,507,895 B2
(45) Date of Patent: Dec. 30, 2025

(54) GDOT: GATED DIFFUSE OPTICAL TOMOGRAPHY

(71) Applicant: William Marsh Rice University, Houston, TX (US)

(72) Inventors: Yongyi Zhao, Houston, TX (US); Ankit Raghuram, Houston, TX (US); Ashok Veeraraghavan, Houston, TX (US); Jacob Robinson, Houston, TX (US)

(73) Assignee: William Marsh Rice University, Houston, TX (US)

( * ) Notice: Subject to any disclaimer, the term of this patent is extended or adjusted under 35 U.S.C. 154(b) by 272 days.

(21) Appl. No.: 18/160,509

(22) Filed: Jan. 27, 2023

(65) Prior Publication Data

US 2023/0233085 A1 Jul. 27, 2023

Related U.S. Application Data

(60) Provisional application No. 63/267,218, filed on Jan. 27, 2022.

(51) Int. Cl.
*A61B 5/00* (2006.01)

(52) U.S. Cl.
CPC ......... *A61B 5/0073* (2013.01); *A61B 5/0068* (2013.01); *A61B 2560/029* (2013.01); *A61B 2562/046* (2013.01)

(58) Field of Classification Search
CPC ............... A61B 5/0073; A61B 5/0068; A61B 2560/029; A61B 2562/046
See application file for complete search history.

(56) References Cited

U.S. PATENT DOCUMENTS

| | | | | |
|---|---|---|---|---|
| 5,853,370 A | * | 12/1998 | Chance | A61B 5/0042 600/431 |
| 2012/0236310 A1 | * | 9/2012 | Lesage | G01N 21/6456 356/432 |
| 2016/0334610 A1 | * | 11/2016 | Kang | G02B 21/0008 |
| 2019/0355773 A1 | * | 11/2019 | Field | H10F 39/8057 |
| 2020/0093377 A1 | * | 3/2020 | Kwon | A61B 5/0053 |

* cited by examiner

*Primary Examiner* — Bo Joseph Peng
(74) *Attorney, Agent, or Firm* — Osha Bergman Watanabe & Burton LLP

(57) ABSTRACT

A system for imaging a target embedded in a scattering media includes: one or more light sources that are pulsed lights at one or more wavelengths in a range of visible to near-infrared; a detector, including a photodetector array with a time-gating function, configured to collect a scattered light after a gate start time; and a processor configured to determine an image of the target based on the scattered light.

17 Claims, 17 Drawing Sheets

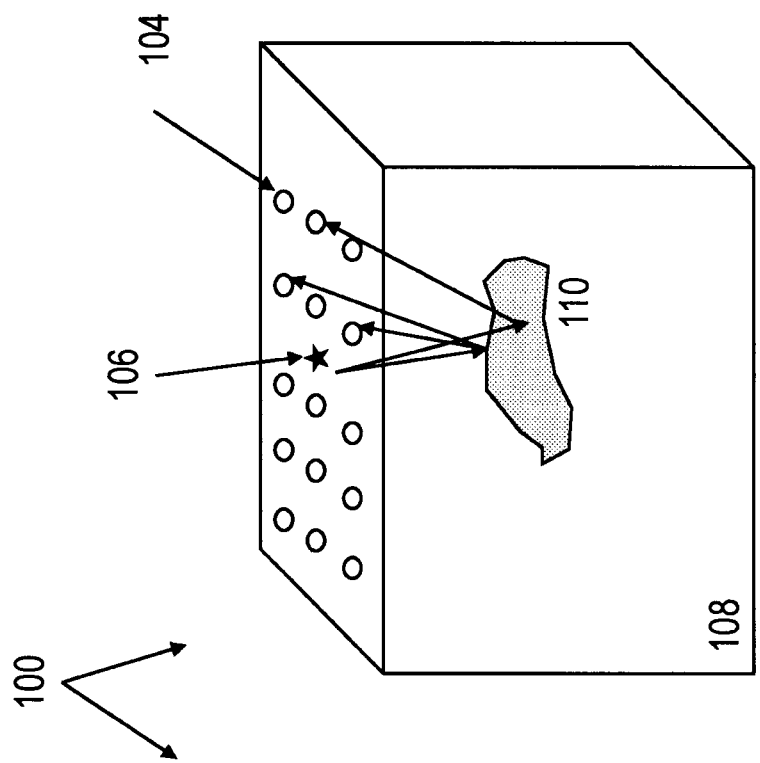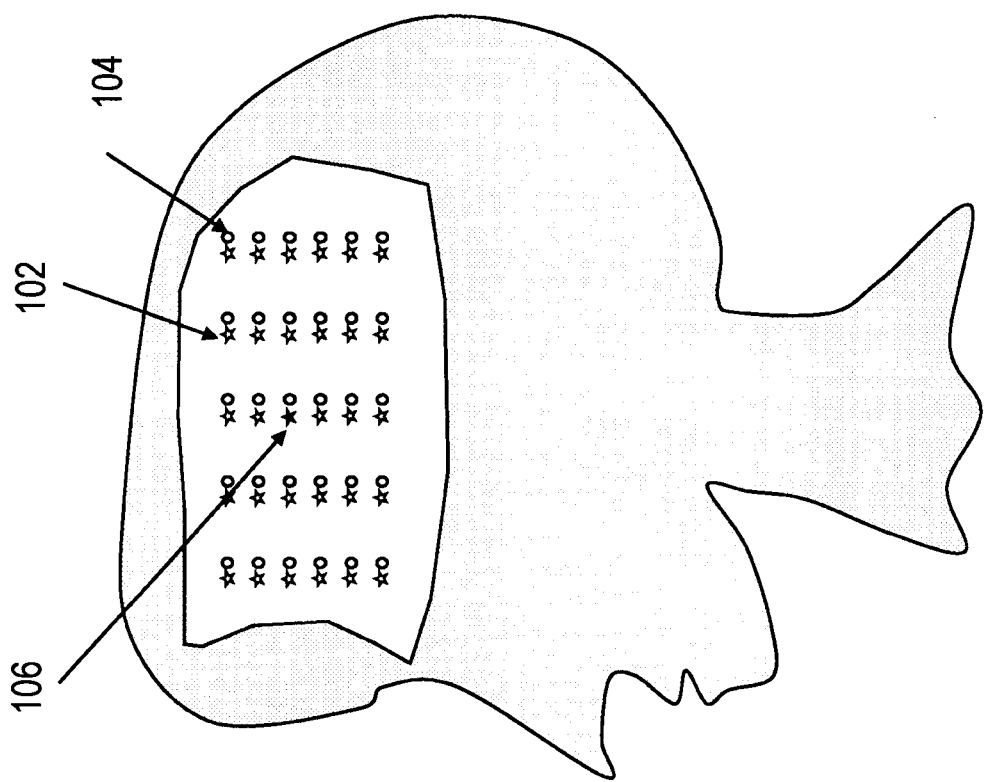
FIG. 1B
FIG. 1A

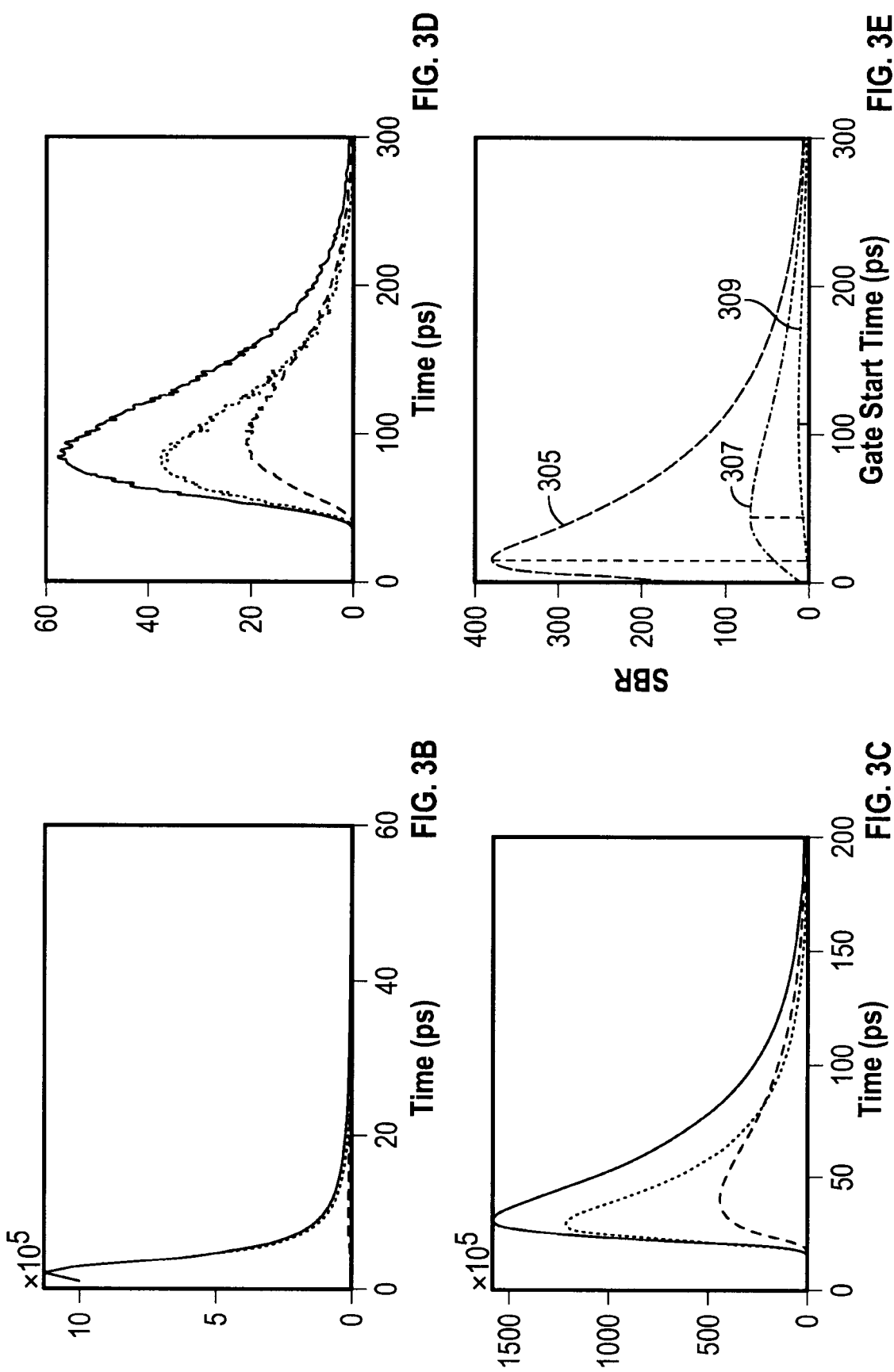

GDOT: GATED DIFFUSE OPTICAL TOMOGRAPHY

CROSS-REFERENCE TO RELATED APPLICATION

This Patent Application claims priority from U.S. Provisional Application No. 63/267,218, filed on Jan. 27, 2022. The content of this application is hereby incorporated herein in its entirety.

STATEMENT REGARDING FEDERALLY SPONSORED RESEARCH OR DEVELOPMENT

This invention was made with Government Support under grants CCF-1730574 by the National Science Foundation (NSF) and N66001-19-C-4020 by Defense Advanced Research Projects Agency (DARPA). The government has certain rights in this invention.

BACKGROUND

Electromagnetic (EM) radiation at wavelengths in the visible to near-infrared is a non-invasive optical tool to image a tissue, but EM scattering remains a challenge for deep tissue optical imaging. Ballistic imaging techniques, such as confocal and multiphoton microscopies, have been developed to reduce the effect of light scattering. These techniques preferentially filter out as much of the scattered photons as possible while retaining as much of the ballistic (or single scattered) photons as possible. However, the number of ballistic photons available for detection decreases exponentially with depth of penetration, limiting the use of ballistic imaging techniques for a depth of larger than 20 scattering mean free paths (MFPs).

Diffuse optical tomography (DOT) is an optical imaging technique that allows for deep tissue optical imaging, using wearable, safe, and relatively inexpensive apparatus. DOT includes a spatially distributed array of light sources and detectors in pair (i.e. source-detector pairs), and light propagating (e.g., ballistic and diffuse photons) between each source-detector pair is recorded. A physically realistic, computational model (forward model) of light propagation, scattering, absorption, and optionally fluorescence is used to relate the optical properties of the tissue to the detected light.

Rapid development of single-photon avalanche diode (SPAD) arrays and their ability to obtain transient information has led to time-of-flight diffuse optical tomography ("ToF-DOT"). In ToF-DOT, rather than recording a scalar intensity light transport for each source-detector pair, a time series of light intensity is recorded: i.e., received photons are binned based on their time-of-travel and a one-dimensional time series is recorded for each source-detector pair. ToF-DOT has been demonstrated to produce significant improvement in reconstruction resolution and quality for deep tissue optical imaging. However, the addition of the time series recording comes with additional challenges. For example, the sensor system hardware complexity increases significantly, reducing sensor performance and increasing costs. Further, the size, cost and data—dimensionality constraints imposed by the additional transient dimension necessitates a reduction in the number of source-detector pairs—thereby trading spatial diversity for increased time-of-flight diversity in the measurements. In addition, the increased dimensionality of the measurements results in super-linear increases (empirically between quadratic and quartic) in computational complexity, making reconstruction algorithms impractically slow.

There is a great demand for a deep tissue optical imaging technique providing significant improvements over existing methods in image reconstruction quality, resolution, and using fast data acquisition measurements and reconstruction algorithms to produce near-real-time images.

SUMMARY

In some aspects, the techniques described herein relate to a system for imaging a target embedded in a scattering media, including: one or more light sources that are pulsed lights at one or more wavelengths in a range of visible to near-infrared; a detector, including a photodetector array with a time-gating function, configured to collect a scattered light after a gate start time; and a processor configured to determine an image of the target based on the scattered light.

In some aspects, the techniques described herein relate to a system, wherein the light sources and the detector are disposed on a surface of the scattering media.

In some aspects, the techniques described herein relate to a system, wherein the light sources and the detector are in form of an array of light source and detector pairs.

In some aspects, the techniques described herein relate to a system, wherein the detector is configured to stop collecting the scattered light after a gate close time.

In some aspects, the techniques described herein relate to a system, wherein gate start time and the gate close time for each source-detector pair are separately configured.

In some aspects, the techniques described herein relate to a system, wherein the light sources are configured to switch on simultaneously.

In some aspects, the techniques described herein relate to a system, wherein the light sources are configured to switch on one after another and the detector are configured to collect the scattered light correspondingly.

In some aspects, the techniques described herein relate to a system, wherein the time-gating function is hardware-based by an on-chip delay on the photodetector array.

In some aspects, the techniques described herein relate to a system, wherein the time-gating function is software-based by data processing.

In some aspects, the techniques described herein relate to a system, wherein the processor is configured to use an algorithm to determine the image of the target, wherein the algorithm includes a forward model based on Monte Carlo.

In some aspects, the techniques described herein relate to a system, wherein the processor is configured to determine a two-dimensional image or a three-dimensional image of the target.

In some aspects, the techniques described herein relate to a system, wherein the target is a human tissue or an animal tissue.

In some aspects, the techniques described herein relate to a system, wherein the target is fluorescent.

In some aspects, the techniques described herein relate to a system, wherein the system is operable in a confocal geometry.

In some aspects, the techniques described herein relate to a method of imaging a target in a scattering media, including: generating one or more light sources that are pulsed lights at one or more wavelengths in a range of visible to near-infrared; detecting a scattered light after a gate start time with a detector, including a photodetector array with a time-gating function; and determining an image of the target based on the scattered light.

In some aspects, the techniques described herein relate to a method, wherein an algorithm is used in determining the image of the target, wherein the algorithm includes a forward model based on Monte Carlo.

In some aspects, the techniques described herein relate to a method, wherein the detecting of the scattered light stops after a gate close time.

In some aspects, the techniques described herein relate to a method, wherein the light sources and the detector are in form of an array of light source and detector pairs.

In some aspects, the techniques described herein relate to a method, further includes: detecting two or more of the scattered light with different wavelengths or at different times; and determining an image of the target based on a difference or a ratio of the two or more scattered lights.

In some aspects, the techniques described herein relate to a method, further includes determining an image of the target based on a change in absorption or reflection properties of the target.

Other aspects and advantages of one or more embodiments disclosed herein will be apparent from the following description and the appended claims.

BRIEF DESCRIPTION OF THE DRAWINGS

FIGS. 1A and 1B show examples of a GDOT system according to one or more embodiments of the present disclosure.

FIGS. 3A to 3E show an example of scanning and photon propagation in a GDOT system according to one or more embodiments of the present disclosure.

DETAILED DESCRIPTION

Figure 2:
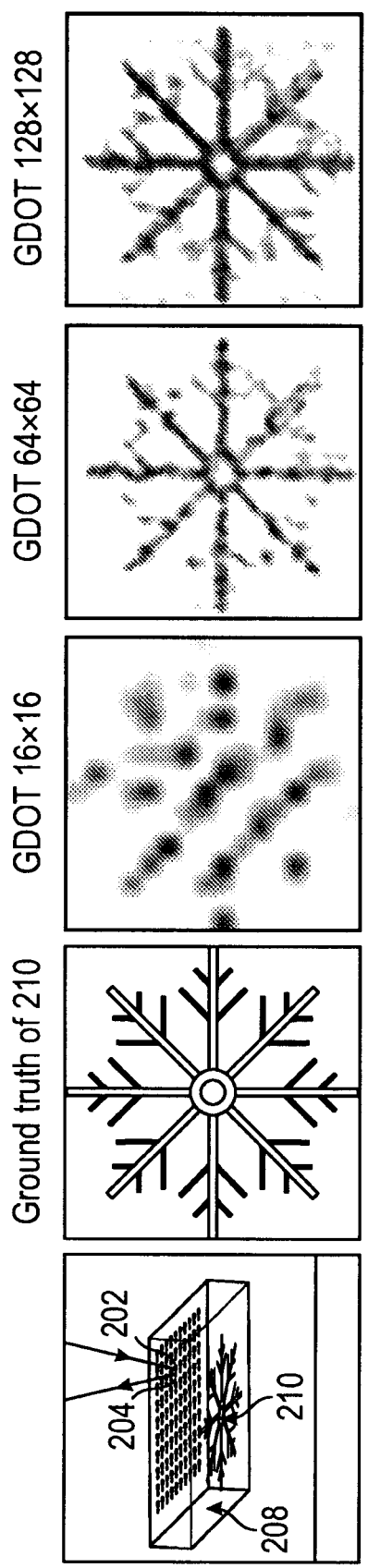
FIG. 2 shows an example of high-resolution imaging using a GDOT system according to one or more embodiments of the present disclosure.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure.

For brevity, at least a portion of these components are implicitly identified based on various legends. Further, descriptions of these components will not be repeated with regard to each figure. Thus, each and every embodiment of the components of each figure is incorporated by reference and assumed optionally present within every other figure having one or more like-named components. Additionally, in accordance with various embodiments of the present disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

Compared to ballistic imaging, DOT has the ability to image at increased depth penetration. Conventional DOT according to one or more embodiments of the present disclosure uses continuous-wave, and each detector records only the detected intensity. However, conventional DOT has poor spatial resolution with most techniques achieving a resolution at centimeter level. Sparse distribution of light sources and detectors is used due to hardware limitations, poor contrast, and difficulty achieving high spatial resolution through thick scattering media. Conventional DOT systems use optical fibers, which are usually bulky and limit the number of sources and detectors. In addition, for close source-detector separations, most DOT systems would fail due to a high flux of uninformative, short path length photons.

In contrast to DOT, which uses detectors that can only measure intensity, time-of-flight diffuse optical tomography (ToF-DOT) uses specialized detectors, which directly capture the time-domain measurements. ToF-DOT of the present disclosure may also be referred to as time-domain diffuse optical tomography or time-resolved diffuse optical tomography, and the detectors record light transport transient information. A variety of techniques, such as Fourier series or temporal filtering may be applied to the time domain measurements to obtain higher quality image reconstructions. Additionally, temporal information (e.g., rejecting early arriving photons with time-gating) may lead to enhanced signal to background ratio at close source-detector separations. ToF-DOT systems may use streak cameras and photomultiplier tubes (PMT), which are expensive and bulky. ToF-DOT systems may use single photon avalanche diodes (SPAD) which are relatively inexpensive, achieve tens of picosecond timing resolution, and can be incorporated to wearable devices with miniaturized and flexible electronics. SPADs may be switched on and off at a fast rate (e.g., at least 50 MHz) with fast rise and fall times due to relatively low bias voltage (e.g., about 5 V) and low capacity loading (e.g., less than 1 pF). However, SPADs possess low fill factors, which may be compounded by a large area occupied by time to digital converters and the associated logic for generating time-of-flight transients. In ToF-DOT systems, SPADs are associated with on-chip time correlated single photon counting (TCSPC) to bin the photons into separate bins that correspond to different time-of-flight ranges, effectively producing a one dimensional transient measurement. The use of TCSPC increases hardware complexity and needs more space on chip, thus limiting the density or total number of source-detector pairs.

The present disclosure provides a gated DOT (GDOT) system which measure a photon intensity using a time-of-travel gate instead of measuring the entire transient, such that only a single measurement per source-detector pair is collected. The GDOT system disclosed herein eliminates the need of TCSPC hardware, which significantly reduces the hardware complexity, yet still allows increased fill-factors, better detector performance, and much denser are more total number of arrays than those in conventional DOT and ToF-DOT systems. The GDOT system disclosed herein is also capable of deep imaging at more than 50 MFPs, while at the same time achieve superior spatial resolution to both DOT and ToF-DOT systems.

The GDOT system according to one or more embodiments of the present disclosure may include an array of light sources and an array of detectors distributed over a surface area of a sample. The light sources and the detectors may be in form of array of source-detector pairs. Each light source in the array may be a pulsed light source with a short pulse duration. Each detector may be a photodetector. In some embodiments, the detector may be a SPAD associated with a transient gate that ensures that the detector is insensitive to photons that arrive before the gate is turned on and/or after the gate is turned off. In some embodiments, a picosecond delay (PSD) may be used to control a gate start time and a gate close time for hardware-based time gating. The gate start time and the gate close time may be programmatically controlled. In one or more embodiments, the gate start time and the gate close time for each source-detector pair may be separately controlled. When a light source is turned on, the gated light transport data between each source-detector pair is measured. The light sources may be switched on simultaneously or switched on one after another. The light source may be light at wavelengths from visible to near-infrared. The light source may be generated by a light source device, for example, a laser such as a Ti:Sapphire laser, a Cr:Forsterite laser, a Cr:ZnSe laser, a Cr:YAG laser, a Nd:YAG laser, a Yb:YAG laser, a Yb-glass laser, and a semiconductor laser. The light source may be ultrashort light pulses (e.g., femtosecond, picosecond, and nanosecond pulses) having wavelengths in the range of about 600 to 1500 nm so as to obtain deep penetration into tissue. The SPADs are high performance detectors capable of photon counting and sub-nanosecond time-gating, allowing time-domain measurements with sub-nanosecond gating of thousands of SPAD elements (i.e., pixels) packed into a small active camera area. In some embodiments, a picosecond delay (PSD) may be used to control the gate start time for hardware-based time gating. The gate start time for each detector may be programmatically controlled. Alternatively, the time-gating function may be software-based and is performed through data selection and processing. The gate provides separation of early-arriving and late-arriving photons, which is advantageous for deep imaging since most of the early-arriving photons are background photons that do not contain any signal information. The gating also allows the GDOT system to use close source-detector separations, increasing the sensitivity and spatial resolution of deep imaging.

The GDOT system according to one or more embodiments of the present disclosure may record the information between the gate start time and the gate close time, and each GDOT measurement may be modeled as a time-gated photon count in a single time bin, therefore satisfies shift invariance and eliminating the hardware complexity. To the contrary, ToF-DOT record the entire transient having a plurality of time bins. Even when post-selecting data may be used in ToF-DOT systems to select time bins after a gate time, they still suffer from hardware complexity and time consuming due to the need of recording, selecting, and processing large sets of data for reconstruction.

The GDOT system according to one or more embodiments of the present disclosure may include a sample to be imaged including a target and a media. The target may be embedded in or disposed below the scattering media and is visibly obscure when viewing through the scattering media. The target may be an absorber and may be any material that absorbs light at certain wavelengths of interest. The scattering media may be a scatter and may be any material that scatters light at certain wavelengths of interest. In one or more embodiments, the target may be a human tissue or an animal tissue. For example, the target may be a human brain and the scattering media may be a skull scalp hair and tissue. In one or more embodiments, the target may be a fetus and the scattering media may be tissues and fluids surrounding the fetus.

The GDOT system according to one or more embodiments of the present disclosure may be configured to use Monte Carlo (MC) to generate a forward model used for image reconstruction (i.e., recover spatial distribution of optical properties). The image reconstruction may be performed for a two-dimensional image or a three-dimensional image. The forward model is used to relate the unknown optical properties of the media and the target (the scattering, absorption and/or fluorescence coefficients) to the measurements. In one or more examples, the forward model may be based on a diffusion-based model of light propagation. For example, the reconstruction algorithm may focus on iteratively solving approximations of the Radiative Transfer Equation (RTE), which may yield more accurate results than a Diffusion Equation. RTE is the governing equation for light transport in a volumetric scattering media, and is represented by equation (1):

$$\frac{\partial L(\vec{r}, \hat{s}, t)/c}{\partial t} = \qquad (1)$$

-continued $$-\hat{s} \cdot \nabla L(\vec{r}, \hat{s}, t) - \mu_t L(\vec{r}, \hat{s}, t) + \mu_s \int_{4\pi} L(\vec{r}, \hat{s}', t) P(\hat{s}' \cdot \hat{s}) d\Omega' + S(\vec{r}, \hat{s}, t),$$

where, t is time, ŝ is solid angle, and vector $\vec{r}$ is position. The RTE states that the change in light energy $L(\vec{r}, \hat{s}, t)$ is equal to light lost minus light gained. Light loss comes from divergence (ŝ∇L( $\vec{r}$, ŝ, t)), as well as absorption and out-scattering ($\mu_t$L( $\vec{r}$, ŝ, t)). Lightgain comes from in-scattering ($\mu_s \int_{4\pi}$L( $\vec{r}$, ŝ', t)P(ŝ'·ŝ)dΩ') and light sources (S( $\vec{r}$, ŝ, t)). RTE may be used to calculate the number of photons that reach the detector, from a particular source (i.e., the light transport measurements), as a function of the unknown sample parameters.

To perform reconstruction, instead of directly using equation (1), one should firstly determined how changes in the optical parameters lead to the set of measurements using Born Approximation. Under the Born Approximation, the RTE can be reduced to a linear model represented by: m=J$\mu_{all}$, where J is the Jacobian (or sensitivity matrix), m is the set of light transport transients (i.e., measurements), and vector, μ is the optical parameters of the scattering media and the target having dimension N, where N is the number of voxels in the discretized sample. m has a dimension Q=$N_s N_d N_T$, representing the number of sources, detectors, and time bins, respectively. The Jacobian J is a mapping from μ to m, which has a dimension of Q×N. Many medium parameters such as the uniform absorption coefficients of the medium can be assumed to be known ($\mu_{known}$) while other scene/target optical parameters (μ) need to be estimated (typically the absorption or fluorescence coefficients of the target). The linear model can be further expanded as: m=J$\mu_{all}$=J$\mu_{known}$+Jμ. Since the Jacobian J is known, it may be rewritten as: m−J$\mu_{known}$=Jμ. The Jacobian determines the sensitivity of a particular measurement to a change in the optical parameters at a particular position. The ik-th entry of J is represented by $$J_{ik} = \frac{m_i}{\mu_k}.$$

The Jacobian represents me sensitivity, of a particular light transport measurement to an unknown optical parameter at a particular location. The entries of the Jacobian are related to the likelihood that a photon measured in a source-detector pair will pass through a particular point in space. The sensitivity is a function of time and space are may be used to recover information on features that are embedded deeper within the scattering media. A longer time of flight (i.e., later-arriving time bins in ToF-DOT) shows increased sensitivity to deeper features because the later-arriving time bins correspond to photons with longer path lengths and higher likelihood to propagate deeper within the scattering media. On the other hand, a shorter time of flight (i.e., early-arriving time bins in ToF-DOT) shows higher sensitivity to shallow features.

MC algorithms are used because diffusion approximation assumes isotropic scattering and may lead to inaccurate approximations for low-scattering media and near the light sources. In the MC algorithms, simulated photons are propagated along a random walk (i.e., a photon path). As a photon propagates, it will travel in a straight-line trajectory until it reaches a scattering-absorption event. The length of the trajectory is sampled from an exponential distribution due to the exponential falloff in the number of unscattered photons. At the scattering-absorption event, the photon is scattered in a new direction. The updated direction is sampled from the Henyey-Greenstein (HG) distribution, which is an accurate model of scattering in biological tissue The photon paths are sampled from a probability distribution, which is determined based on the scattering and absorption coefficient, anisotropy factor, and refractive index of the imaging target. By averaging the information over many sampled photo paths, the bulk properties of the photon distribution may be estimated. The MC algorithms describe the likelihood that a photon will pass through a particular position by averaging the number of photons that reach a specific voxel. Based on the MC algorithms, GDOT measurements may be extracted by integrating a subset of time bins corresponding to the predetermined gate start time. The MC algorithms in one or more embodiments of the present disclosure may be parallelized using Cuda C++ and require a few minutes to a few hours to complete, depending on the sample complexity. The Jacobian may be pre-computed and therefore does not affect the runtime of the reconstruction algorithms.

The GDOT system according to one or more embodiments of the present disclosure may have a confocal geometry, which uses spatial filtering through a pinhole rejecting out-of-plane scattered photons, or a non-confocal geometry. The number of measurements is proportional to the number of light sources and detectors, however not all data is equally useful for image reconstruction. Measurements collected from source-detector pairs that are separated at a large distance (i.e., larger than a few millimeters) may be noisier and more diffuse, providing little information comparing to nearby source-detector pairs. In confocal geometry, only entries of the measurement vector, which correspond to the collocated source-detector pairs, are used.

In some embodiments, a convolutional approximation may be applied to the forward model for the GDOT system having a confocal geometry, allowing a higher speed in reconstruction and shift invariance. In some embodiments, the convolutional approximation may be implemented using fast Fourier transform (FFT) to reduce computational complexity. In some embodiments, the point spread function (PSF) used in the convolutional model may be simulated using the MC algorithms or analytical expressions, by determining the measurement in the presence of a delta function, which is a single absorbing voxel. Since the run time of the MC algorithms is proportional to the number of light sources that are simulated, a faster approach to obtain the PSF is by determining a row of the Jacobian: simulating a single source-detector pair and a voxel array corresponding to the desired PSF dimensions.

The GDOT system according to one or more embodiments of the present disclosure may be configured to determine an image of the target based on measured scattered light. The system may be configured to inversely reconstruct the image of the target using a reconstruction algorithm. A predicted scattered light of an estimate of the target, predicted using a forward model according to one or more embodiments of the present disclosure, is compared with the measured scattered light. An optimization function is used to determine if the predicted scattered light and the measured scattered light match to a predetermined level. If the differences between the predicted scattered light and the measured scattered light are not optimized to the predetermined level, an estimate of the target and the optimization function may be updated. The measured scattered light is obtained by lightening one or more light sources, optionally in turn, and measure a scattered light at one or more detectors between a gate start time and a gate close time. In some embodiments, the gate close time is the end of the transient. The gate start time serves as a predetermined non-zero delay in the algorithm. In some embodiments, the reconstruction algorithm may comprise an optimization function based on equation (2), $$\hat{\mu} = \min_{\mu} |J\mu - m|_2 + R(\mu) \qquad (2)$$

where μ is a desired ground truth scene, J and m are the Jacobian and captured measurements respectively, R( ) is a regularizer. A number of linear solvers exist for a sparse recovery problem when $R(\mu)=|\mu|_1$. In some embodiments, a fast iterative shrinkage threshold algorithm (FISTA) may be used. The algorithm used for the present disclosure should not limit to the examples provided herein. Any suitable algorithm may be used, such as cost function minimization using least square, or linear algebra matrix inversion, or machine learning.

The GDOT system according to one or more embodiments of the present disclosure may comprise a fluorescent target. A time delay between the instance when a photon is absorbed by a fluorophore and when it is re-emitted as an emission photon is considered. In the time domain, the delay may be modeled by convolving a zero-lifetime transient prole with an exponential function, parameterized by the lifetime of the fluorophore. The zero-lifetime transient refers to a differential signal that would have been obtained if there is no delay between photon absorption and re-emission.

In some embodiments, the GDOT system according to one or more embodiments of the present disclosure may be configured to reconstruct an image of the target based on a change in absorption or reflection properties of the target. In some embodiments, the GDOT system according to one or more embodiments of the present disclosure may be configured to detect two or more of the scattered light with different wavelengths or at different times; and to determine an image of the target based on a difference or a ratio of the two or more scattered lights.

FIGS. 1A and 1B show examples of a GDOT system according to one or more embodiments of the present disclosure. The GDOT system 100 includes sources 102 (hollow stars), detectors 104 (hollow circles), and a target 110, where the sources and detectors are disposed on a scalp to image embedded brain tissue which serves as the target of interest. Other human tissues between the source-detector pairs and the target 110 serve as a scattering media 108. When a source is lightened to become an active source 106 (solid star), the measurement of scattered light is obtained at one or more detectors, which has a time-gating between a gate start time and a gate close time. In one or more embodiments, the time-gating function may be performed directly on-chip on the detector, for example using a delayer. Alternatively, the time-gating function may be performed software-based through processing a time histogram of detected photons.

FIG. 2 shows an example of high-resolution imaging using a GDOT system according to one or more embodiments of the present disclosure with high resolution image through a millimeter thick scattering media. The laser light sources 202 and detectors 204, with different array densities (e.g., 16×16, 64×64, 128Δ128) and a source-detector separation of 0.5 mm, scan on the scattering media 208 that obscures a target 210. GDOT, with dense arrays, may perform imaging on a complex snowflake target through a scattering media having a certain thickness (e.g., 9 MFPs). GDOT reconstructions through a 1 mm scattering medium at different scan resolutions are shown. The high resolution scan shows more accurately distinguish thin branches of the snowflake that are lost at poorer resolutions.

Figure 3A:
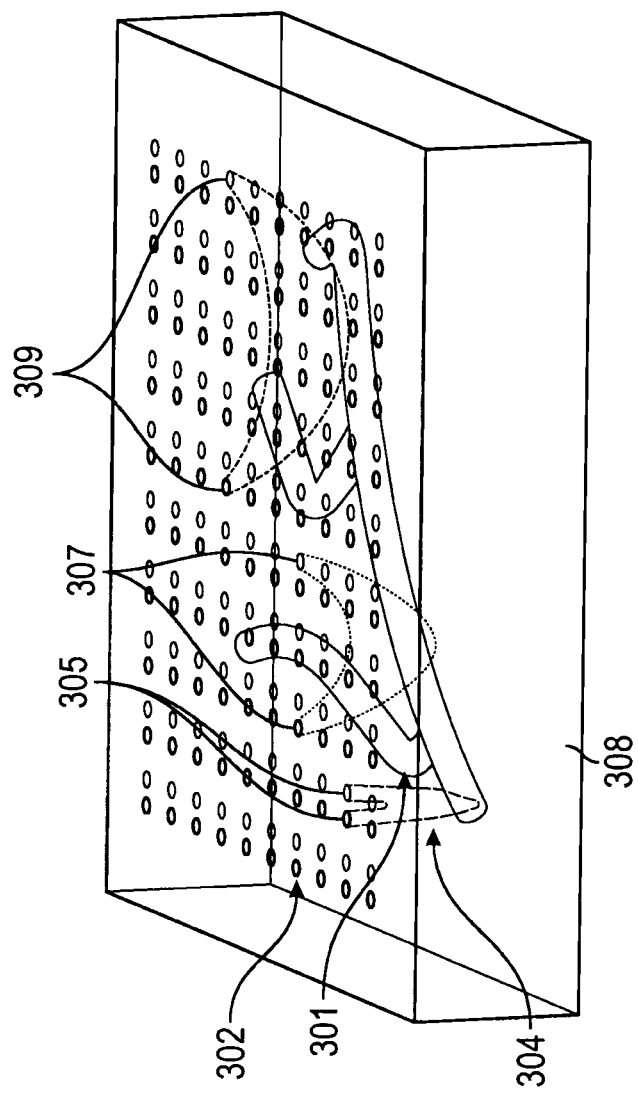

FIGS. 3A to 3E show an example of scanning and photon propagation in a GDOT system according to one or more embodiments of the present disclosure. In FIG. 3A, an array of source-detector pairs 302 are disposed on a scattering media 308 having a thickness of about 50 MFPs. A target 304 is embedded in the scattering media. In some embodiments, the target may be a vasculature target 301. Transients between some selected source-detector pairs are presented. FIGS. 3B, 3C, and 3D represent photon propagation for source-detector pairs of a close separation 305, a medium separation 307, and a far separation 309, respectively. Total photons, signal photons that have interacted with the target, and background photons that have not interacted with the target for each source-detector pair are presented from top to bottom in each of the FIGS. 3B-3D. The transient gated signal to background ratio (SBR), corresponding to the close separation 305, the medium separation 307, and the far separation 309, are shown in FIG. 3E, as a function of the gate start time. By selecting a proper gate start time, the SBR and reconstruction performance may be significantly improved.

Figure 4:
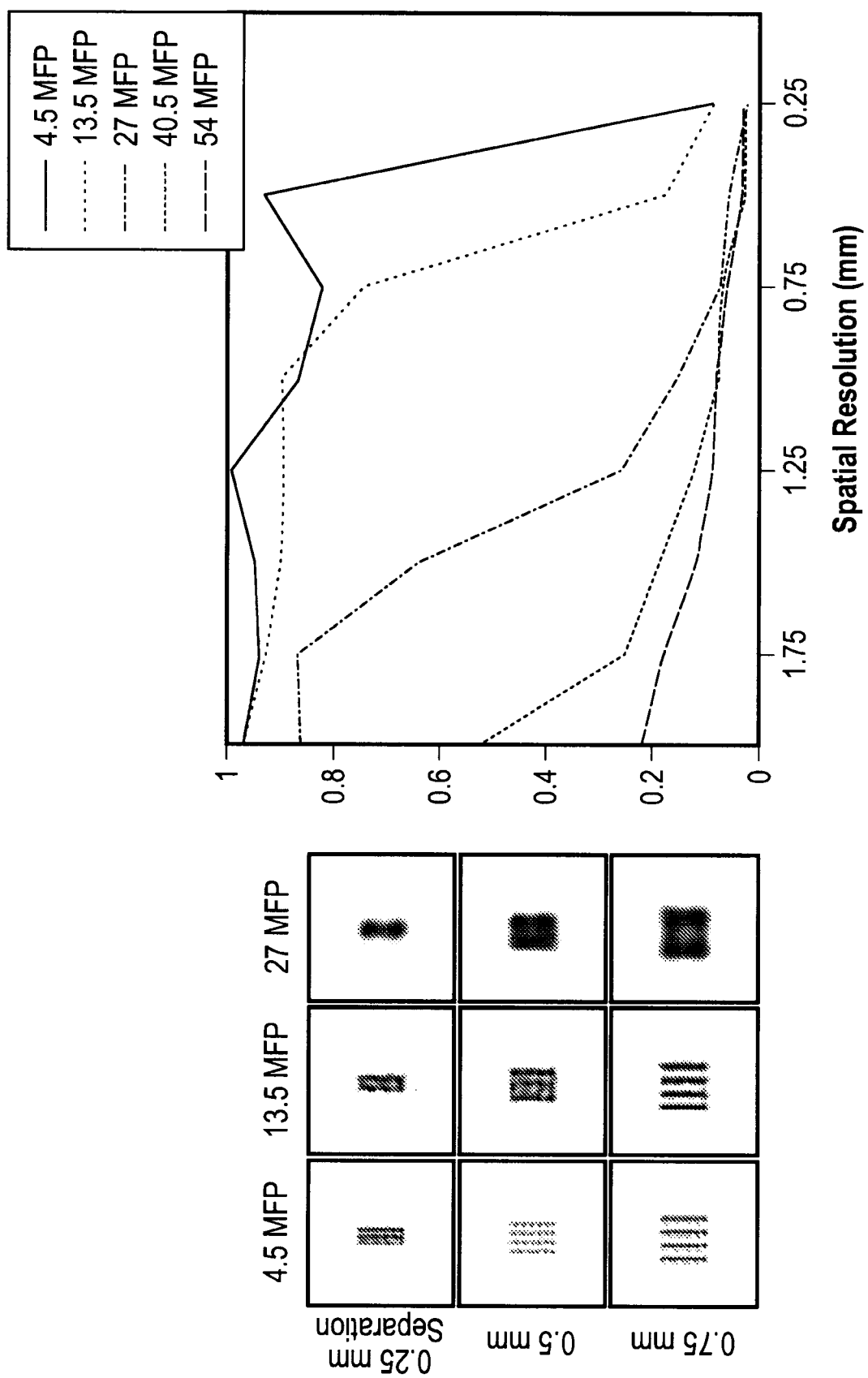
FIG. 4 shows an example of image reconstruction using a GDOT system according to one or more embodiments of the present disclosure.

FIG. 4 shows an example of image reconstruction using a GDOT system according to one or more embodiments of the present disclosure. Spatial resolution is characterized by determining the minimum separation distance at which two features, usually two lines or two point sources, are resolved as distinct. For each ground truth image, a set of measurements and image reconstruction are simulated. For each group of vertical lines with varying separation distances, the modulation transfer function (MTF) versus the spatial resolution is shown. A M value between 0 and 1 is calculated by $$M = \frac{A\max - A\min}{A_{max} + A_{min}},$$

representing how well the lines are resolved. A M value close to zero represents that the lines may be fused together. The function of M establishes a relationship between the line spacing and the system's ability to resolve fine features and is referred to as modulation transfer function (MTF). The MTF for various optical thicknesses of the scattering media correspond to how well the spatial resolution images are reconstructed. Image reconstruction may be performed at various millimeter-level separations (e.g., 0.25 mm, 0.5 mm, 0.75 mm) and at various depth (e.g., 4.5 MFP, 13.5 MFP, 27 MFP, 40.5 MFP, 54 MFP), with a degradation in performance when a thickness of scattering media increases.

Figure 5A:
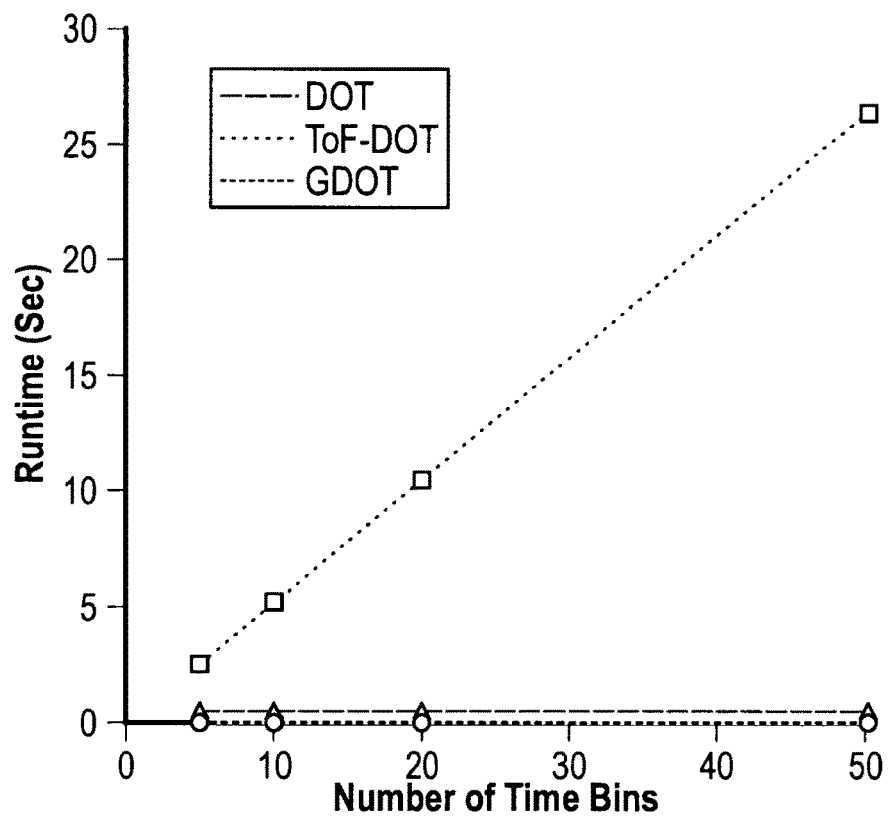
FIGS. 5A and 5B show comparison of runtimes for DOT, ToF-DOT, and GDOT systems according to one or more embodiments of the present disclosure.
Figure 5B:
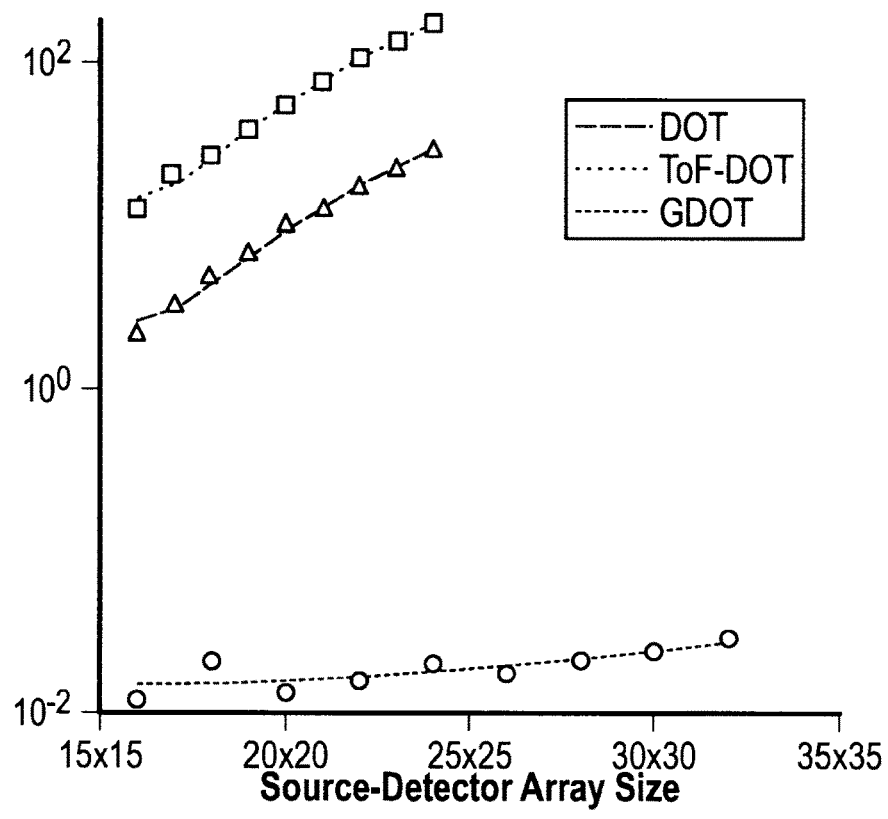

FIGS. 5A and 5B show comparison of runtimes for a DOT system, a ToF-DOT system, and a GDOT system according to one or more embodiments of the present disclosure. To establish a fair comparison, FISTA algorithm is used for all three systems by running 100 iterations for each forward model. The runtimes relate to number of time bins (i.e., time resolution) shown in FIG. 5A and source-detector array size shown in FIG. 5B. The GDOT system shows a dramatic improvement in the runtime. In the ToF-DOT system, as the timing resolution increases, the runtime for the inverse solver increases because the volume of data increases as the timing resolution increases. To the contrast, both the DOT and the GDOT systems show almost constant the runtime remains constant. When varying the size of source-detector arrays, the voxel pitch is kept equal to the detector pitch to maintain the shift invariance needed for the convolutional approximation in the GDOT system. Corresponding voxel pitch are also used for the DOT and the ToF-DOT systems. The GDOT system according to one or more embodiments of the present disclosure significantly outperforms the ToF-DOT and the DOT systems. Since the DOT and the ToF-DOT systems use sparse source-detector pairs, measurements from all pairs of sources and detectors are considered, precluding the use of a convolutional approximation.

Figure 6:
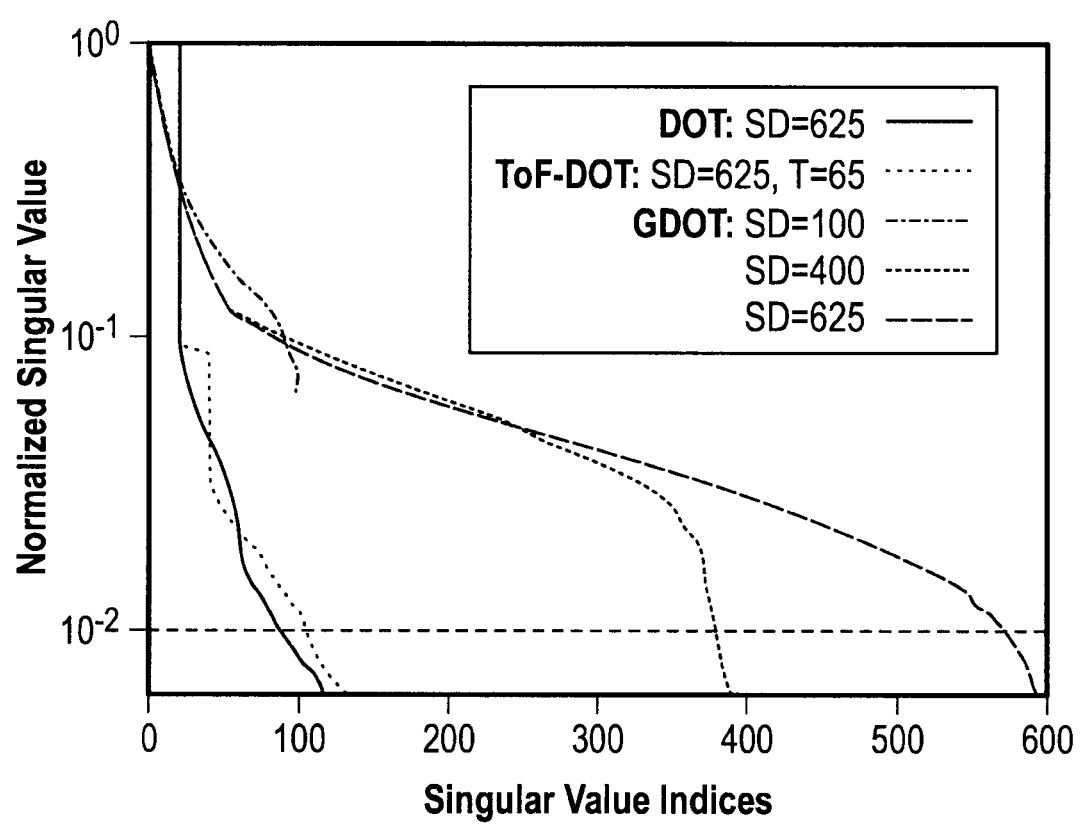
FIG. 6 shows singular values of Jacobian matrices plotted for DOT, ToF-DOT, and GDOT systems according to one or more embodiments of the present disclosure.

In one or more embodiments of the present disclosure, conditioning of Jacobian may affect the quality of image reconstruction. For DOT and ToF-DOT, the Jacobian matrices are generated with all pairs of sources and detectors. For GDOT, since a higher density of sources and detectors may be used, only the collocated source-detector pairs are considered. FIG. 6 shows singular values of Jacobian matrices plotted for a DOT system, a ToF-DOT system, and a GDOT system according to one or more embodiments of the present disclosure. For the DOT and the ToF-DOT systems, the density of sources and detectors (represented in numbers of source-detector pair (SD) used) is 625 source-detector pairs. A number of time bins (T) used for the ToF-DOT system is 65. For the GDOT system, the density of sources and detectors is varied from 100 to 625 (e.g., 100, 400, and 625) total source-detector pairs. The Jacobian matrix is characterized based on the falloff of its singular values when a noise cutoff threshold is set to $10^{-2}$ (dashed line). The conditioning of the Jacobian matrix is significantly improved for the GDOT systems comparing to the DOT and the ToF-DOT systems, especially when a larger density of source-detector pairs is used.

Figure 7:
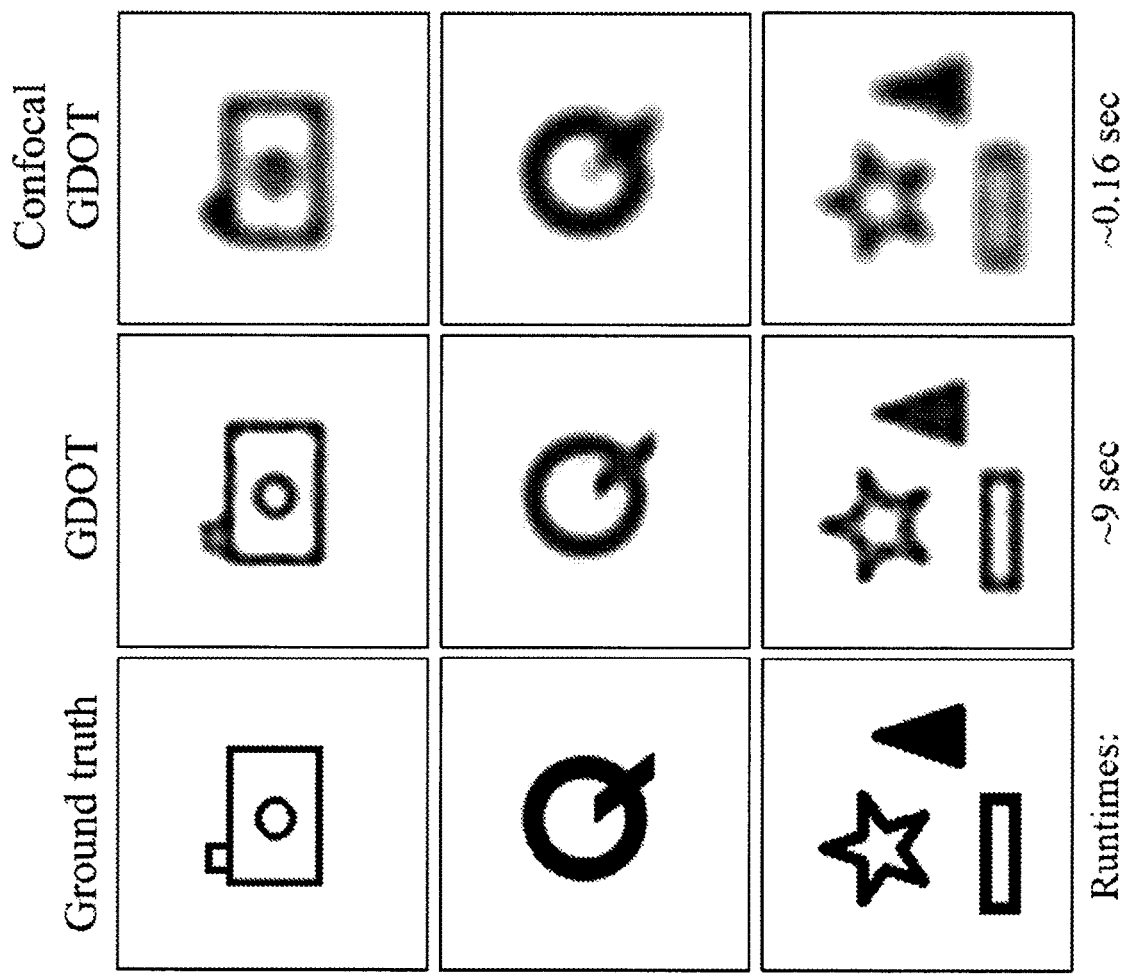
FIG. 7 shows image reconstruction with confocal and non-confocal geometries of a GDOT system according to one or more embodiments of the present disclosure.

Using simulated measurements, image reconstruction algorithm used in the GDOT system in one or more embodiments of the present disclosure may be applied in both confocal and non-confocal geometries, as shown in FIG. 7. For the confocal geometry, we use a source array and detector array of size 128×128. For the non-confocal geometry, sources having an array size of 128×128 and detectors having an array size of 1024×1024 are used. Since the measurements size reaches 128×128×1024×1024=$2^{22}$, not all source-detector pairs are considered in the non-confocal system. Instead, for each source point, an 8×8 array of detectors is considered. The same reconstruction parameters are used for both the confocal and non-confocal GDOT systems. The quality of the image reconstruction is improved in the non-confocal geometry due to additional data pointes, at the cost of increased computational overhead, which results in about 50 times increase in the runtime, as compared to the confocal geometry.

Figure 8:
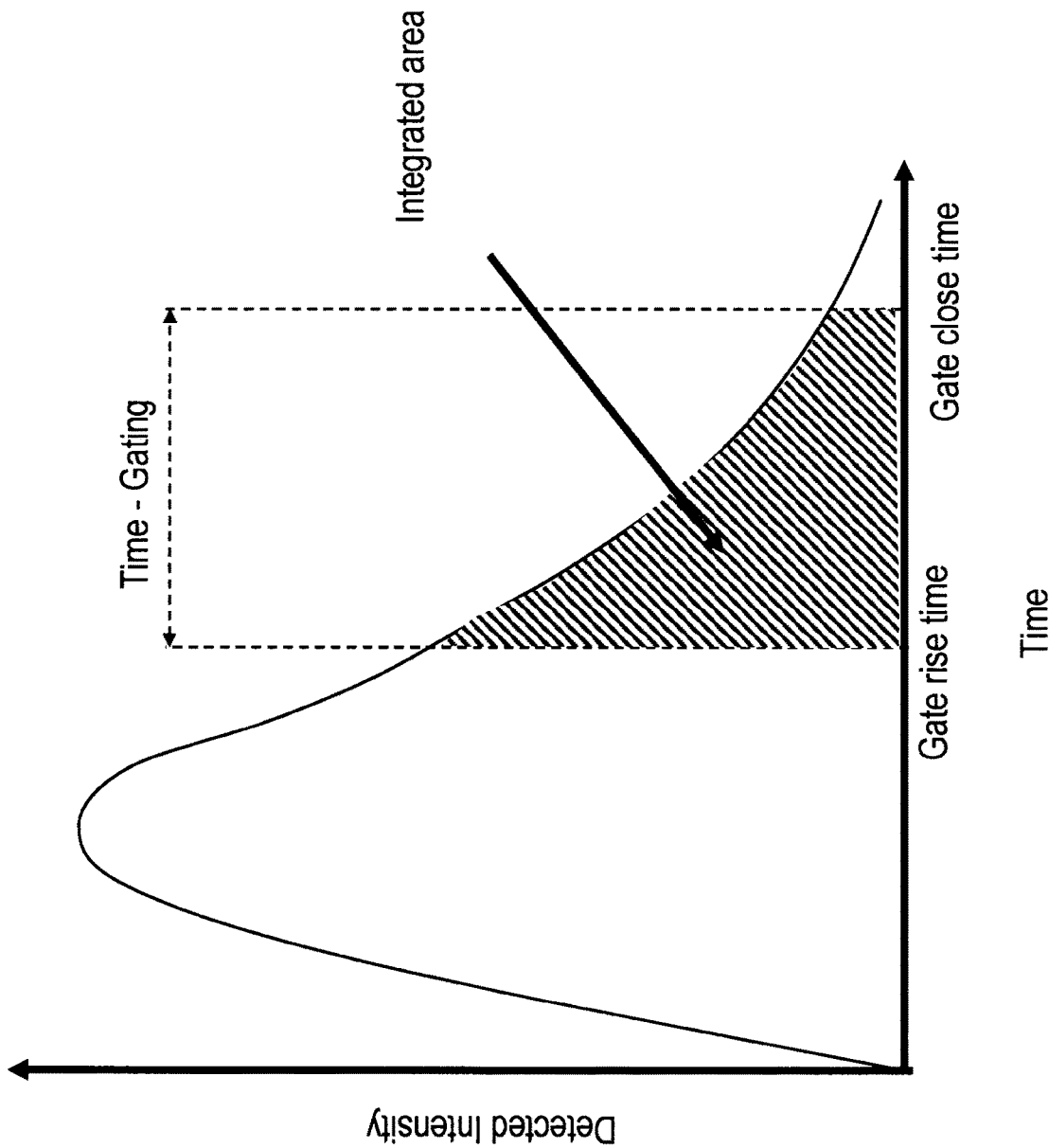
FIG. 8 shows time-gating selection in a GDOT system according to one or more embodiments of the present disclosure.
Figure 9B:
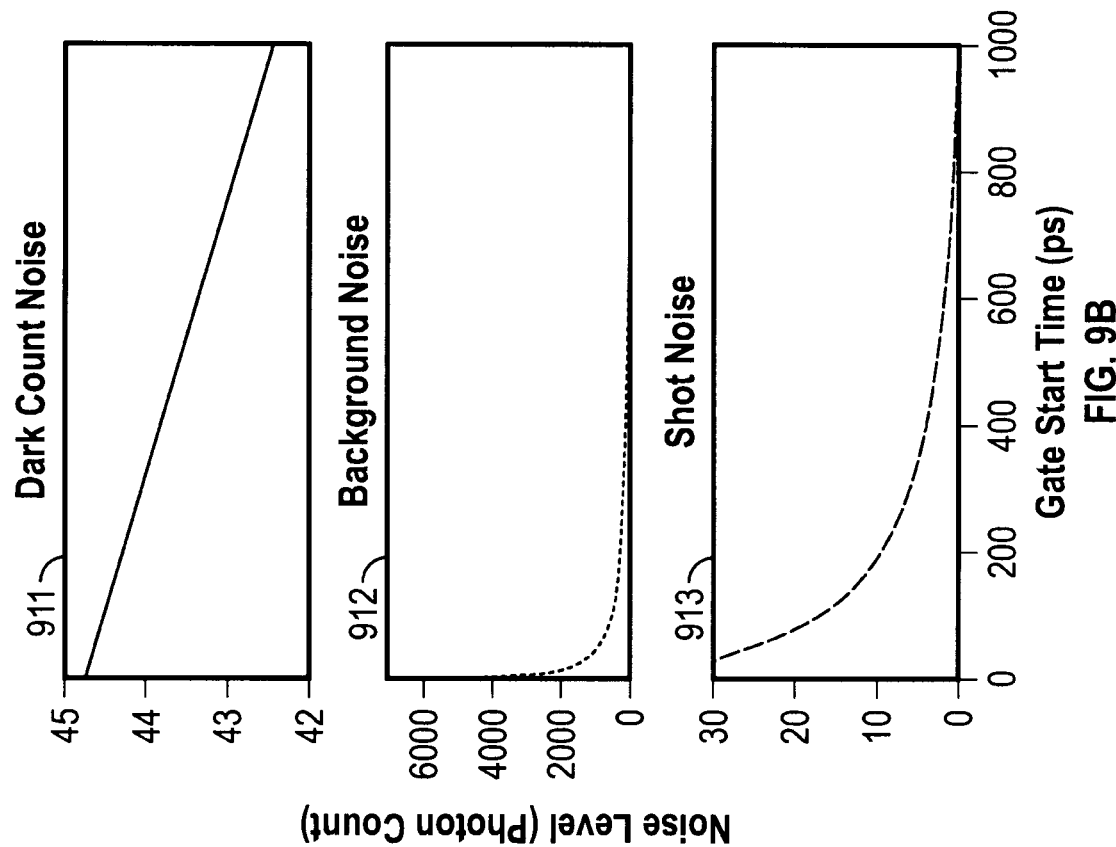
FIGS. 9A to 9E show optimization of gate start time for a GDOT system according to one or more embodiments of the present disclosure.
Figure 9A:
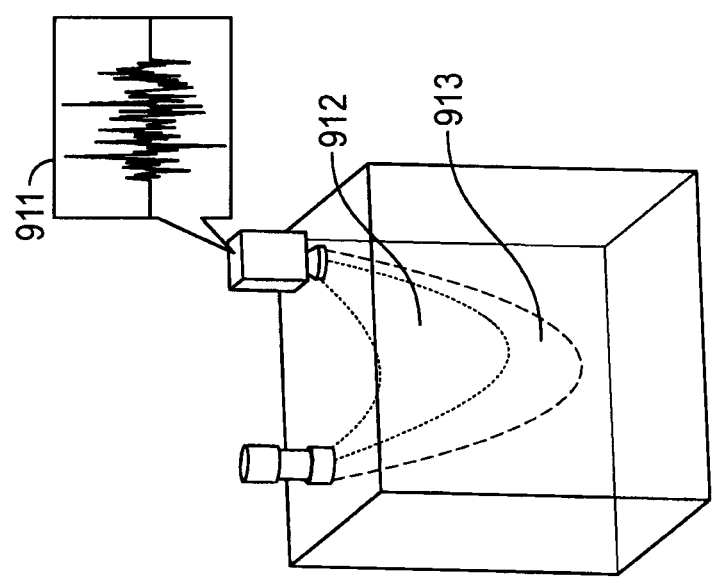
Figure 9C:
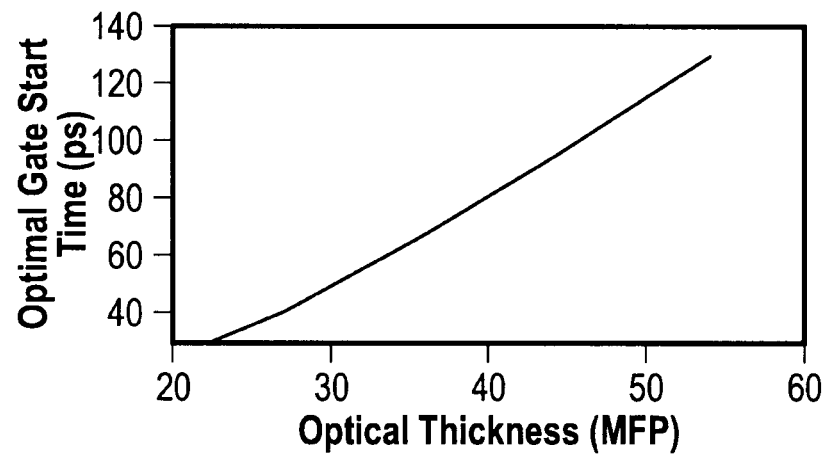
Figure 9D:
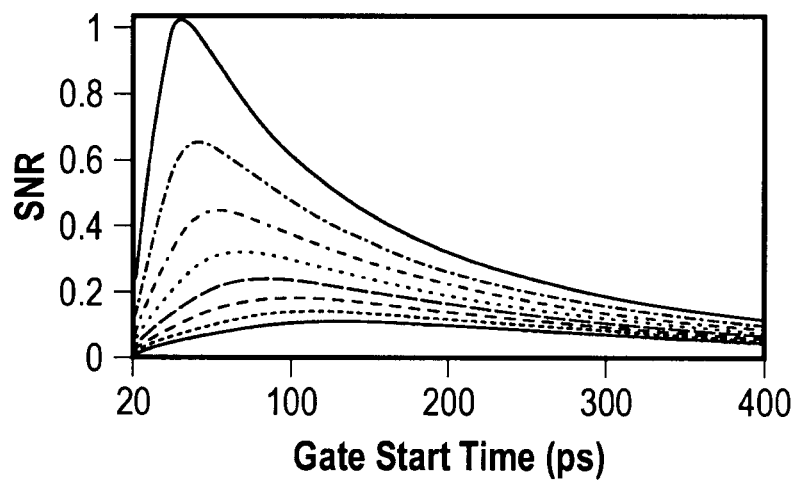
Figure 9E:
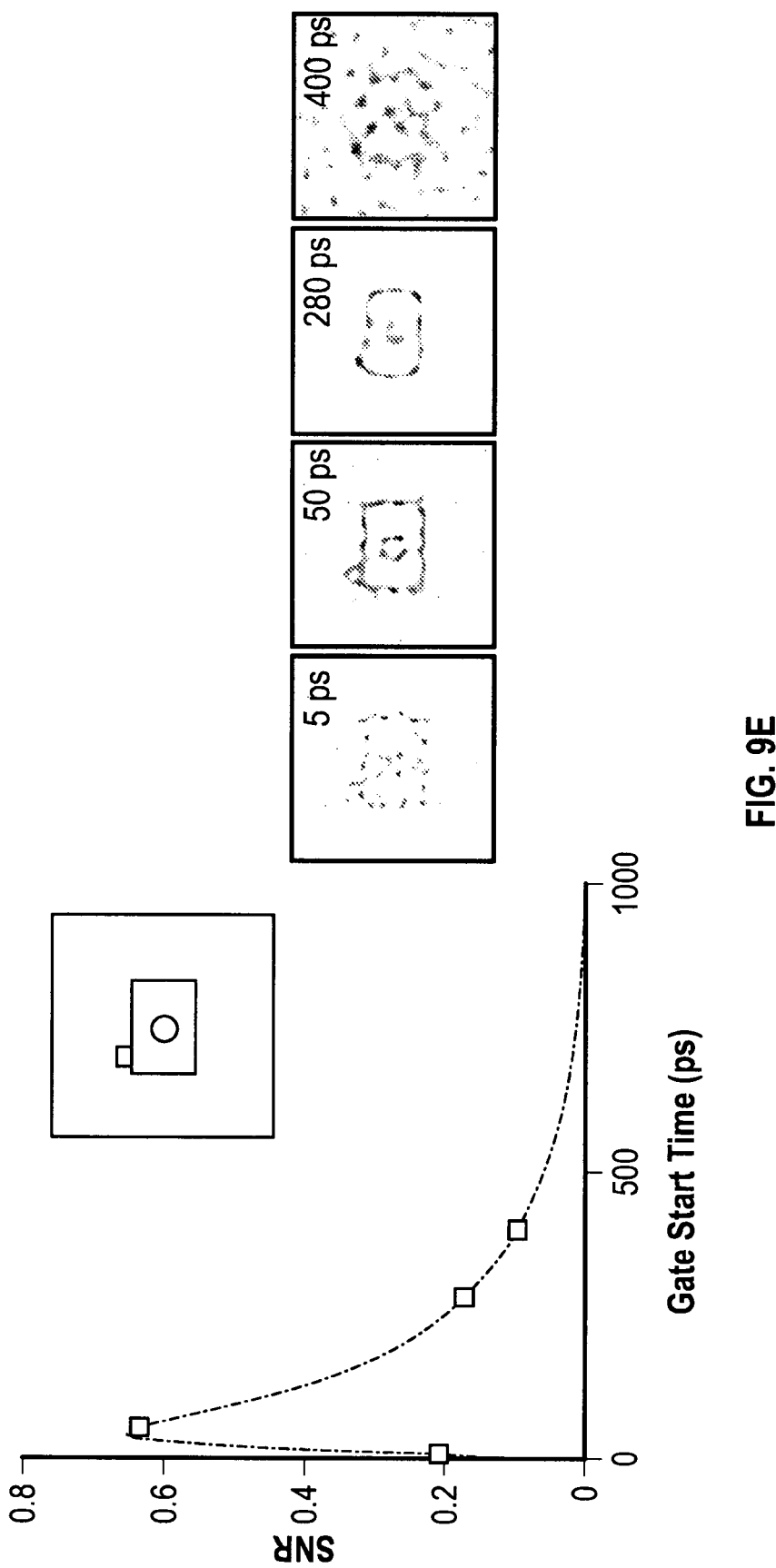

FIG. 8 shows time-gating selection in GDOT systems according to one or more embodiments of the present disclosure. The time-gating window is restricted by a gate start time and a gate close time and an area of integrated intensity of scattering light is used for reconstruction. In some embodiment, the gate close time is the end of the transient. In some embodiment, the gate start time is optimized by maximizing signal to noise ratio. FIGS. 9A to 9E show optimization of gate start time (i.e., the transient where detection begins) in GDOT systems according to one or more embodiments of the present disclosure. If the gate start time is too early, the background noise will be large. If the gate start time is too late, useful signal may be rejected by the time gate. As such, the gate start time may be optimized by maximizing the signal to noise ratio (SNR). The sources of noise, for a system shown in FIG. 9A, may include dark count noise 911, background noise 912, and shot noise 913, whose noise levels are shown in FIG. 9B. SNR is calculated by equation (2):

$$SNR = \frac{\int_{t_0}^{t_f} s(t)dt}{\sqrt{\int_{t_0}^{t_f}(s(t)+b(t)+D)dt}} \quad (2)$$

where s(t) and b(t) are the number of signal and background photons detected at time t, respectively, D is the dark count rate, $t_s$ and $t_f$ are gate start time (or gate start time) and laser period which limits the latest time of arrival that can be counted. Simulated results of the noise intensity in FIG. 9B show that the background noise is a dominant source. FIGS. 9C and 9D show how the noise and corresponding gate start time varies as a function of the thickness of the scattering media. In FIG. 9D, the SNR of various gate start times (curves from top to bottom representing 22.5 MFP, 27.0 MFP, 31.5 MFP, 36.0 MFP, 40.5 MFP, 45.0 MFP, 49.5 MFP, and 54.0 MFP, respectively) are shown. For simulated measurements for a thickness of 27 MFPs, the SNR versus gate start time and associated image reconstructions are shown in FIG. 9E for various gate start time. The highest quality image reconstruction quality is achieved near the peak SNR. SNR values shown herein correspond to the values for a single absorber (i.e., a single pixel in the reconstructed image) to determine the optimal gate. However, the final measurements may possess a larger SBR because the target image is composed of multiple absorbers.

Figure 10:
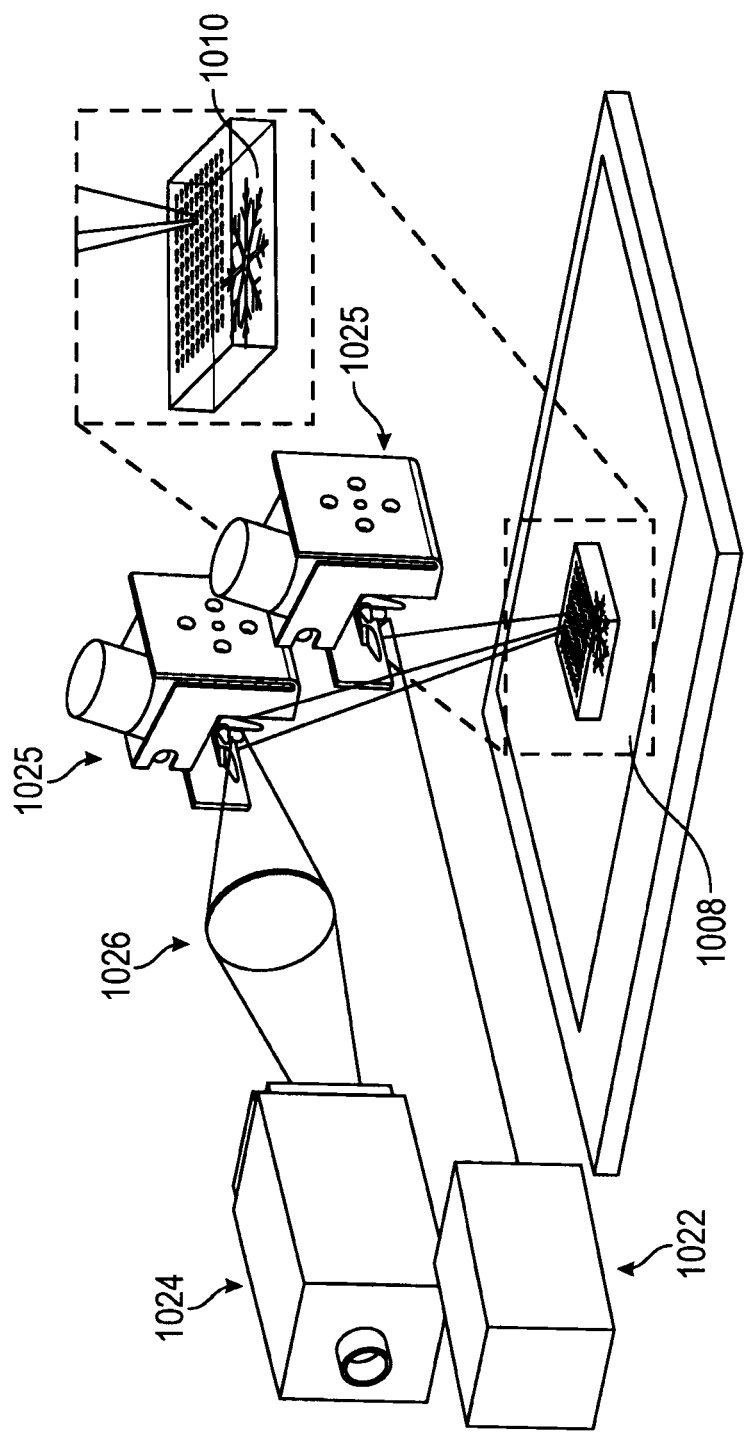
FIG. 10 shows a setup of DOT, ToF-DOT, and GDOT systems according to one or more embodiments of the present disclosure.

FIG. 10 shows a setup of DOT, ToF-DOT, and GDOT systems according to one or more embodiments of the present disclosure. The system may include a light source 1022 and a SPAD detector 1024, scanning on the surface of a scattering media 1008 with a target 1010 underneath. Galvo mirrors 1025, one or more lenses 1026, and a picosecond delay may be used in scanning. In some embodiments, a 680 nm laser may be used for generation of the light source, and the SPAD detector may have a temporal resolution of smaller than 50 ps. For DOT, the full transient for each measurement is integrated, obtaining a scalar intensity value for each scan. For ToF-DOT, the full transient is used for reconstruction. For GDOT, gated measurements are obtained by integrating the transient from a gate start time (dependent on depth and source-detector separation) to a gate close time (e.g., the end of the transient). TCSPC may be used in ToF-DOT systems, but GDOT systems may achieve a higher resolution grid without using TCSPC, thus reducing the hardware complexity.

Figure 11:
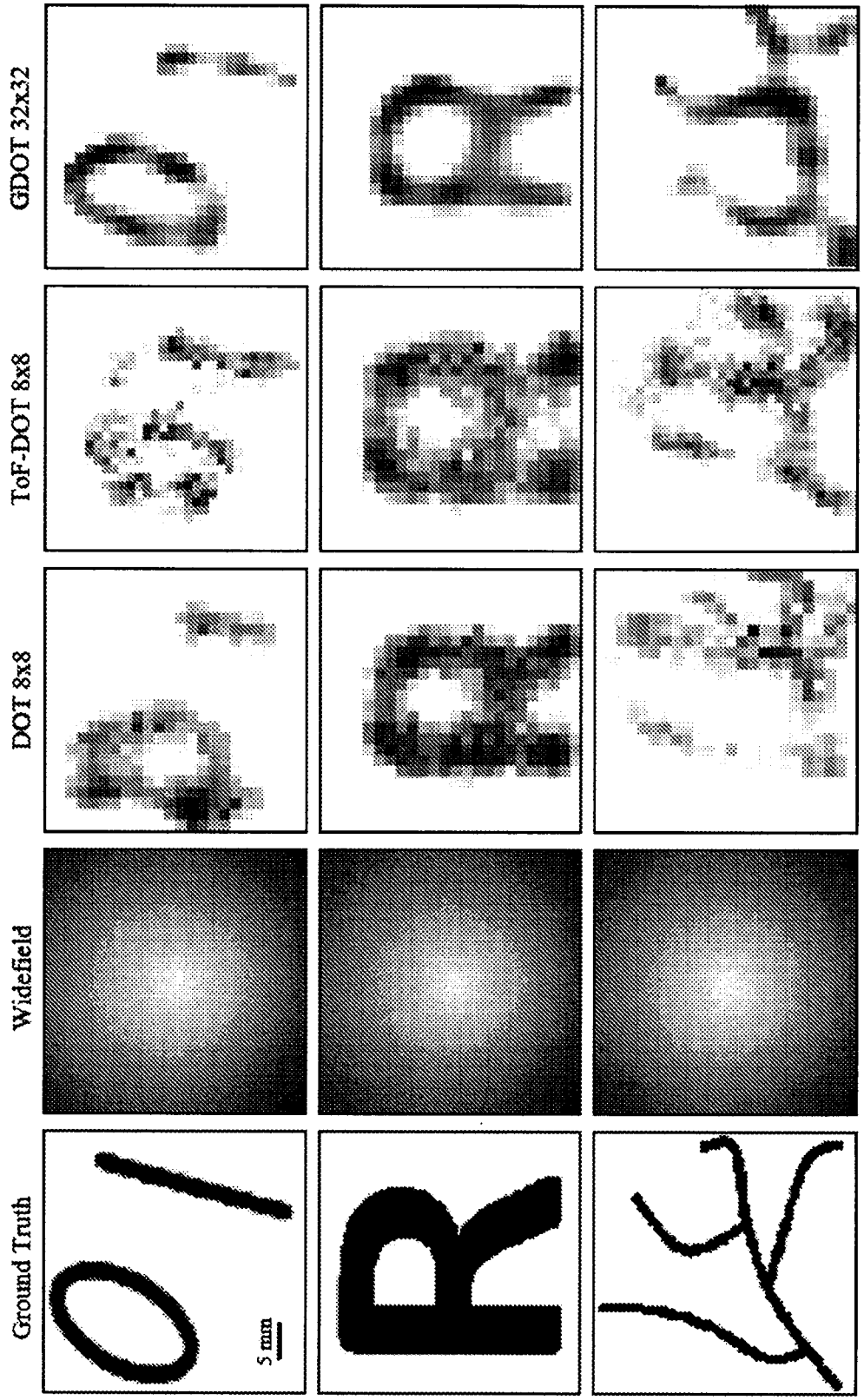
FIG. 11 shows a comparison of imaging for DOT, ToF-DOT, and GDOT systems according to one or more embodiments of the present disclosure.

FIG. 11 shows a comparison of imaging for DOT, ToF-DOT, and GDOT systems according to one or more embodiments of the present disclosure. When the thickness of the scattering media is 6.5 mm (or about 59 MFPs), the target is completely obscured in widefield microscopy images. DOT and ToF-DOT course imaging with 8×8 grid of source-detector pairs show poorer reconstructions of the targets comparing to the GDOT fine imaging with 32×32 grid of collocated source-detector pairs. Furthermore, GDOT reconstruction on the 3 cm span target shows a 5× and 15× speedup in runtime over DOT and ToF-DOT, respectively.

Figure 12:
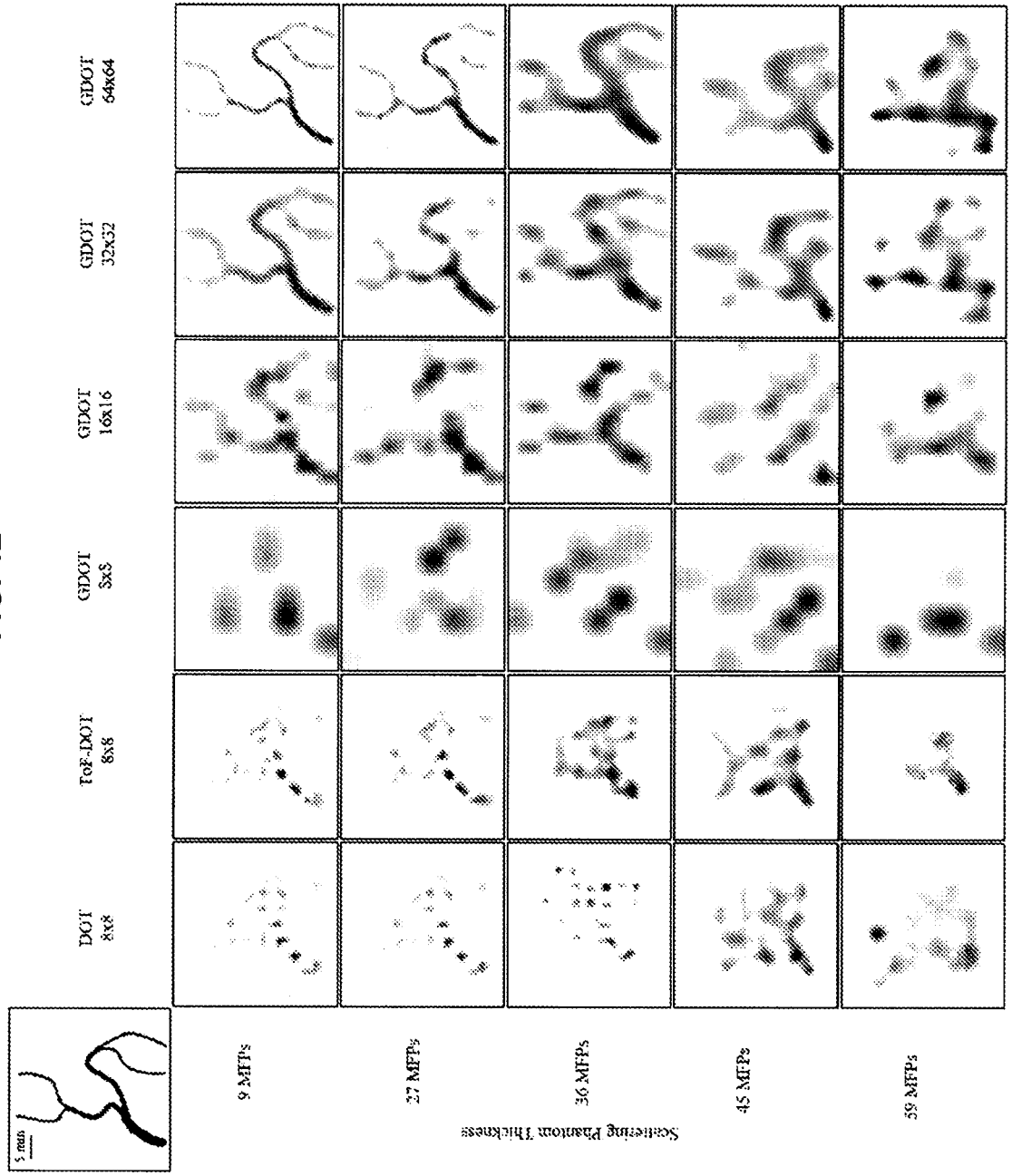
FIG. 12 shows a comparison of imaging for DOT, ToF-DOT, and GDOT systems according to one or more embodiments of the present disclosure.

FIG. 12 shows a comparison of imaging for DOT, ToF-DOT, and GDOT systems according to one or more embodiments of the present disclosure. The target to be imaged (top left) has branch thicknesses of 2 mm, 1 mm, and 0.5 mm, starting from 2 mm thick and progressively branching out into smaller and smaller branches. The reconstruction images for thicknesses at 9, 27, 36, 45, and 59 MFPs are shown. DOT and ToF-DOT fail to resolve the thin and detailed features of the target, even at small thicknesses. GDOT, due to fine sampling, has the ability to accurately identify all branches at small phantom thicknesses. As GDOT resolution increases, the quality of reconstruction images increases. Although non-limiting examples shown in the figures may use a maximum array size of 128×128 grid for GDOT, the array size may have higher resolutions without the need of extra hardware to compute transients.

Figure 13:
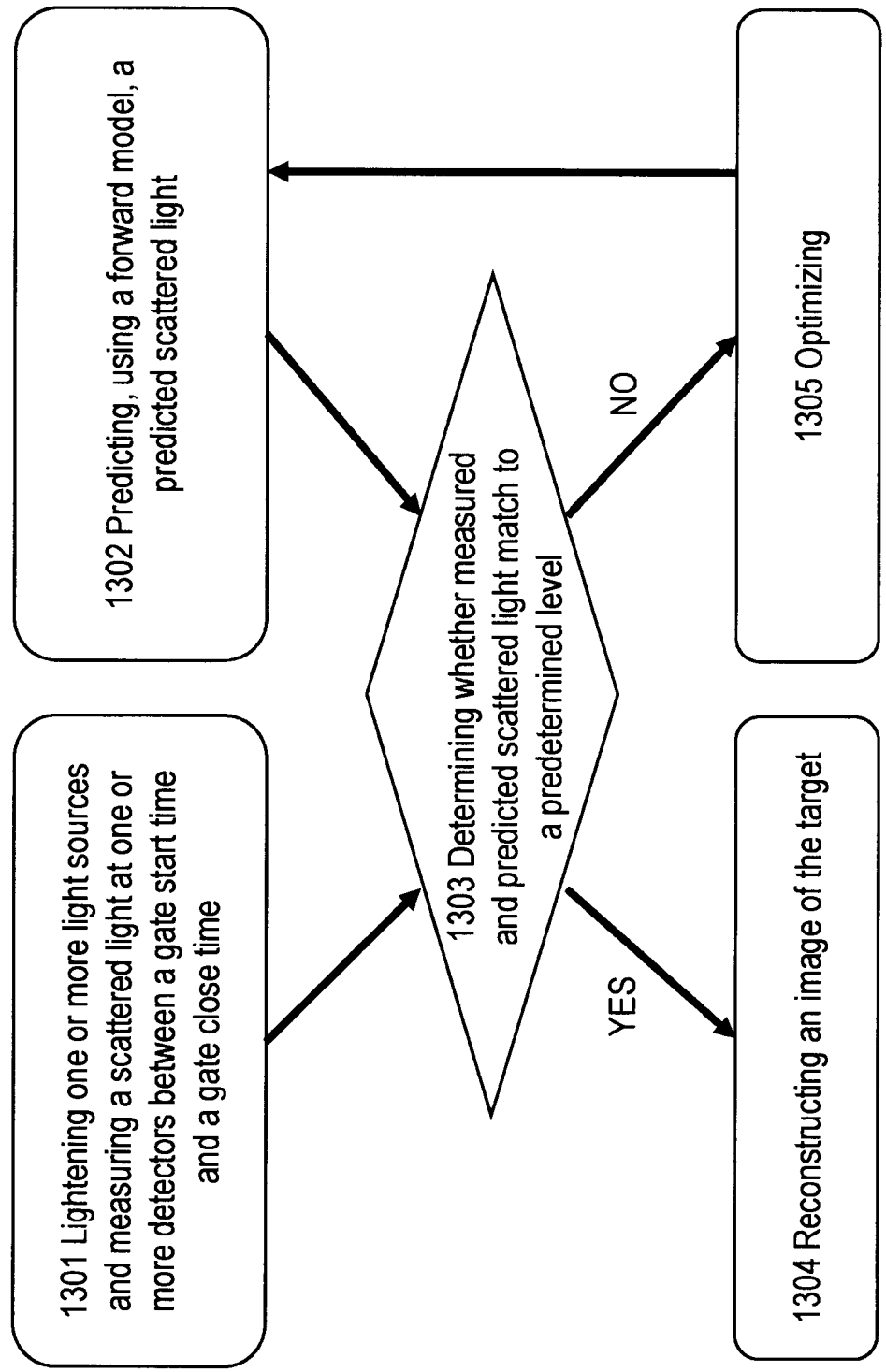
FIG. 13 shows a method for imaging a target in a scattering media using a GDOT system according to one or more embodiments of the present disclosure.

FIG. 13 shows a method for imaging a target in a scattering media using a GDOT system according to one or more embodiments of the present disclosure. In step 1301, one or more light sources are lightened and a scattered light at one or more detectors between a gate start time and a gate close time is measured. In step 1302, a forward model is used to predict a predicted scattered light of an estimate of the target for comparison with the measured scattered light. In step 1303, an optimization function is used to determine whether the measured and predicted scattered light match to a predetermined level. If yes, then the image is reconstructed in step 1304, otherwise the estimate of the target and the optimization function are optimized for predicting and determining again in step 1305.

Figure 14:
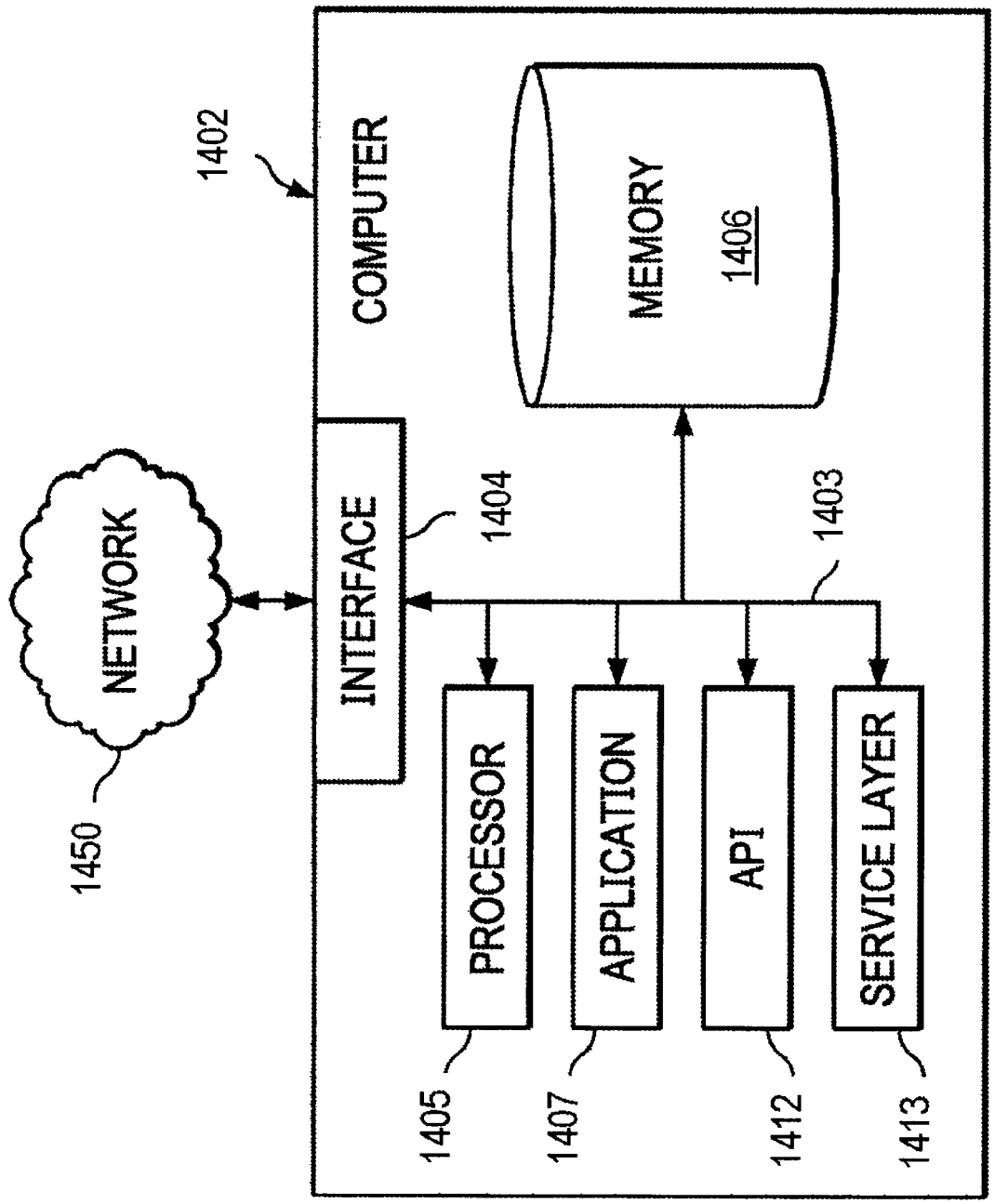
FIG. 14 is a block diagram of a computer system according to one or more embodiments of the present disclosure.

Embodiments may be implemented on a computer system. FIG. 14 is a block diagram of a computer system used to provide computational functionalities associated with described algorithms, methods, functions, processes, flows, and procedures as described in the instant disclosure, according to an implementation. The illustrated computer (1402) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1402) may include a computer that includes an input device, such as a keypad, keyboard, touch screen, or other device that can accept user information, and an output device that conveys information associated with the operation of the computer (1402), including digital data, visual, or audio information (or a combination of information), or a GUI.

The computer (1402) can serve in a role as a client, network component, a server, a database or other persistency, or any other component (or a combination of roles) of a computer system for performing the subject matter described in the instant disclosure. The illustrated computer (1402) is communicably coupled with a network (1450) or cloud. In some implementations, one or more components of the computer (1402) may be configured to operate within environments, including cloud-computing-based, local, global, or other environment (or a combination of environments).

At a high level, the computer (1402) is an electronic computing device operable to receive, transmit, process, store, or manage data and information associated with the described subject matter. According to some implementations, the computer (1402) may also include or be communicably coupled with an application server, e-mail server, web server, caching server, streaming data server, business intelligence (BI) server, or other server (or a combination of servers).

The computer (1402) can receive requests over network (1450) or cloud from a client application (for example, executing on another computer (1402)) and responding to the received requests by processing the said requests in an appropriate software application. In addition, requests may also be sent to the computer (1402) from internal users (for example, from a command console or by other appropriate access method), external or third-parties, other automated applications, as well as any other appropriate entities, individuals, systems, or computers.

Each of the components of the computer (1402) can communicate using a system bus (1403). In some implementations, any or all of the components of the computer (1402), both hardware or software (or a combination of hardware and software), may interface with each other or the interface (1404) (or a combination of both) over the system bus (1403) using an application programming interface (API) (1412) or a service layer (1413) (or a combination of the API (1412) and service layer (1413). The API (1412) may include specifications for routines, data structures, and object classes. The API (1412) may be either computer-language independent or dependent and refer to a complete interface, a single function, or even a set of APIs. The service layer (1413) provides software services to the computer (1402) or other components (whether or not illustrated) that are communicably coupled to the computer (1402). The functionality of the computer (1402) may be accessible for all service consumers using this service layer. Software services, such as those provided by the service layer (1413), provide reusable, defined business functionalities through a defined interface. For example, the interface may be software written in JAVA, C++, or other suitable language providing data in extensible markup language (XML) format or other suitable format. While illustrated as an integrated component of the computer (1402), alternative implementations may illustrate the API (1412) or the service layer (1413) as stand-alone components in relation to other components of the computer (1402) or other components (whether or not illustrated) that are communicably coupled to the computer (1402). Moreover, any or all parts of the API (1412) or the service layer (1413) may be implemented as child or sub-modules of another software module, enterprise application, or hardware module without departing from the scope of this disclosure.

The computer (1402) includes an interface (1404). Although illustrated as a single interface (1404) in FIG. 14, two or more interfaces (1404) may be used according to particular needs, desires, or particular implementations of the computer (1402). The interface (1404) is used by the computer (1402) for communicating with other systems in a distributed environment that are connected to the network (1450). Generally, the interface (1404 includes logic encoded in software or hardware (or a combination of software and hardware) and operable to communicate with the network (1450) or cloud. More specifically, the interface (1404) may include software supporting one or more communication protocols associated with communications such that the network (1450) or interface's hardware is operable to communicate physical signals within and outside of the illustrated computer (1402).

The computer (1402) includes at least one computer processor (1405). Although illustrated as a single computer processor (1405) in FIG. 14, two or more processors may be used according to particular needs, desires, or particular implementations of the computer (1402). Generally, the computer processor (1405) executes instructions and manipulates data to perform the operations of the computer (1402) and any algorithms, methods, functions, processes, flows, and procedures as described in the instant disclosure.

The computer (1402) also includes a memory (1406) that holds data for the computer (1402) or other components (or a combination of both) that can be connected to the network (1450). For example, memory (1406) can be a database storing data consistent with this disclosure. Although illustrated as a single memory (1406) in FIG. 14, two or more memories may be used according to particular needs, desires, or particular implementations of the computer (1402) and the described functionality. While memory (1406) is illustrated as an integral component of the computer (1402), in alternative implementations, memory (1406) can be external to the computer (1402).

Furthermore, memory (1406) can be a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory (1406) may be called a register, a cache, a main memory (main storage apparatus), or the like. Memory (1406) can save a program (program code), a software module, and the like that can be executed to carry out the radio communication method according to an embodiment of the present invention.

The application (1407) is an algorithmic software engine providing functionality according to particular needs, desires, or particular implementations of the computer (1402), particularly with respect to functionality described in this disclosure. For example, application (1407) can serve as one or more components, modules, applications, etc. Further, although illustrated as a single application (1407), the application (1407) may be implemented as multiple applications (1407) on the computer (1402). In addition, although illustrated as integral to the computer (1402), in alternative implementations, the application (1407) can be external to the computer (1402).

There may be any number of computers (1402) associated with, or external to, a computer system containing computer (1402), each computer (1402) communicating over network (1450). Further, the term "client," "user," and other appropriate terminology may be used interchangeably as appropriate without departing from the scope of this disclosure. Moreover, this disclosure contemplates that many users may use one computer (1402), or that one user may use multiple computers (1402).

In some embodiments, the computer (1402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system for imaging a target embedded in a scattering media, comprising:
   one or more light sources that are pulsed lights at one or more wavelengths in a range of visible to near-infrared;
   a detector, including a photodetector array with a time-gating function, configured to collect a scattered light after a gate start time; and
   a processor configured to use an algorithm to determine an image of the target based on the scattered light,
   wherein
   the system has a confocal geometry using spatial filtering through a pinhole rejecting out-of-plane scattered photons, and
   the algorithm includes a forward model based on Monte Carlo and applying convolutional approximation.

2. The system according to claim 1, wherein the light sources and the detector are disposed on a surface of the scattering media.

3. The system according to claim 1, wherein the light sources and the detector are in form of an array of light source and detector pairs.

4. The system according to claim 1, wherein the detector is configured to stop collecting the scattered light after a gate close time.

5. The system according to claim 4, wherein gate start time and the gate close time for each source-detector pair are separately configured.

6. The system according to claim 1, wherein the light sources are configured to switch on simultaneously.

7. The system according to claim 1, wherein the light sources are configured to switch on one after another and the detector are configured to collect the scattered light correspondingly.

8. The system according to claim 1, wherein the time-gating function is hardware-based by an on-chip delay on the photodetector array.

9. The system according to claim 1, wherein the time-gating function is software-based by data processing.

10. The system according to claim 1, wherein the processor is configured to determine a two-dimensional image or a three-dimensional image of the target.

11. The system according to claim 1, wherein the target is a human tissue or an animal tissue.

12. The system according to claim 1, wherein the target is fluorescent.

13. A method of imaging a target in a scattering media, comprising:

generating one or more light sources that are pulsed lights at one or more wavelengths in a range of visible to near-infrared;

detecting a scattered light after a gate start time with a detector, including a photodetector array with a time-gating function;

rejecting out-of-plane scattered photons in the scattered light using spatial filtering through a pinhole; and determining an image of the target based on the scattered light, using an algorithm including a forward model based on Monte Carlo and applying convolutional approximation.

14. The method according to claim 13, wherein the detecting of the scattered light stops after a gate close time.

15. The method according to claim 13, wherein the light sources and the detector are in form of an array of light source and detector pairs.

16. The method according to claim 13, further comprises:
detecting two or more of the scattered light with different wavelengths or at different times; and
determining an image of the target based on a difference or a ratio of the two or more scattered lights.

17. The method according to claim 13, further comprises determining an image of the target based on a change in absorption or reflection properties of the target.

* * * * *